United States Patent
Nandy

(10) Patent No.: US 8,073,915 B1
(45) Date of Patent: Dec. 6, 2011

(54) DETECTION OF CHAIN-LETTERS IN USER-GENERATED COMMENTS FOR WEBSITES

(75) Inventor: Palash Nandy, San Francisco, CA (US)

(73) Assignee: Google Inc., Mountain View, CA (US)

( * ) Notice: Subject to any disclaimer, the term of this patent is extended or adjusted under 35 U.S.C. 154(b) by 115 days.

(21) Appl. No.: 12/122,401

(22) Filed: May 16, 2008

(51) Int. Cl.
*G06F 15/16* (2006.01)

(52) U.S. Cl. .................................................. 709/206

(58) Field of Classification Search .................. 709/206
See application file for complete search history.

(56) References Cited

U.S. PATENT DOCUMENTS

| 2004/0001606 A1* | 1/2004 | Levy | 382/100 |
| 2007/0244974 A1* | 10/2007 | Chasin | 709/206 |

* cited by examiner

Primary Examiner — Kenny Lin
Assistant Examiner — Farhad Ali
(74) Attorney, Agent, or Firm — Fenwick & West LLP

(57) ABSTRACT

Chain-letters within user-generated comments on a website are detected based on an inserted watermark. Comments identified as likely chain-letters are rendered for display with the inserted watermark. When a user propagates a chain-letter by copying and pasting a comment already rendered on the website with the inserted watermark, the inserted watermark is recognized, and a spam score associated with the comment is adjusted. Those comments with spam scores above a predefined threshold are displayed on the website in an altered format.

19 Claims, 6 Drawing Sheets

FIG. 2

```
These are letters: llll
These are numbers: 1111
```

Courier (seriffed) Text
505

These are letters:   lllllll
These are numbers: 1111

Arial (sans-serif) Text
510

*FIG. 5*

DETECTION OF CHAIN-LETTERS IN USER-GENERATED COMMENTS FOR WEBSITES

BACKGROUND

1. Field of Art

The present invention generally relates to detecting spam communications, and more particularly, to detecting chain-letters propagated within user-generated comment sections on websites.

2. Description of the Related Art

Undesired or unrequested bulk electronic messages, collectively referred to as spam, have long been an issue for many websites and Internet users. Traditionally, spam has been generated deliberately by a relatively small numbers of malicious spammers and propagated en masse by such individuals or groups. As such, detection methods have previously focused on tendencies characteristic to centralized spam distribution, for example, identifying an unusually high ratio of outgoing messages to ingoing messages for a particular individual.

However, in websites that allow users to post comments that are then visible to all users, for example in response to a blog, a content, a news article, or the like, a new type of spam has arisen. Specifically, websites that enable users to post their own comments have suffered a resource drain caused by the excessive circulation of chain-letters within those comments. A chain-letter comment will be initiated by a spammer, but then will be largely spread by otherwise innocent or naïve users, who repeatedly copy and paste the comment, and who generally do not appreciate that they are spreading spam messages. This new mode of distribution has rendered previously developed spam detection strategies largely ineffective.

SUMMARY

One embodiment of a disclosed system and method enables a website to automatically identify chain-letters circulated within user-generated comments. A keyword filter is used to identify comments containing words or phrases commonly found within chain-letter comments. Comments containing such words or phrases are treated as probable chain-letter comments, and are rendered on the website with an inserted watermark that can be programmatically identified by program code executing at the website.

Comments are processed for the watermark when they are submitted by a user. If a comment containing the watermark is submitted to the website, this indicates that the comment was most likely copied and pasted from a previously submitted comment already identified as a probable chain-letter comment. A submitted comment is given a spam score. Since copying and pasting (or equivalently, a "reply with quote") is a very common manner of distribution for chain-letter comments, a spam score associated with the comment containing the watermark is then adjusted to reflect the high likelihood that the comment is a form of spam, in this case a chain-letter.

When comments are generated for display on the website, those comments with spam scores above a pre-defined threshold are generated for display in a collapsed or minimized format such that they are not entirely visible to users. For example, a heading or icon associated with a comment with a high spam score may be initially generated for display without the full text of the comment. To see the full text of the comment, a user may have to select the heading or icon. Rendering the comments in the reduced or minimized format beneficially reduces the amount of spam that is displayed to the user, and thus improves the overall user experience.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

FIG. 2 illustrates some sample chain-letter comments.

FIG. 5 illustrates some examples of seriffed and sans-serif font.

The figures depict various embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Architectural Overview

Figure 1:
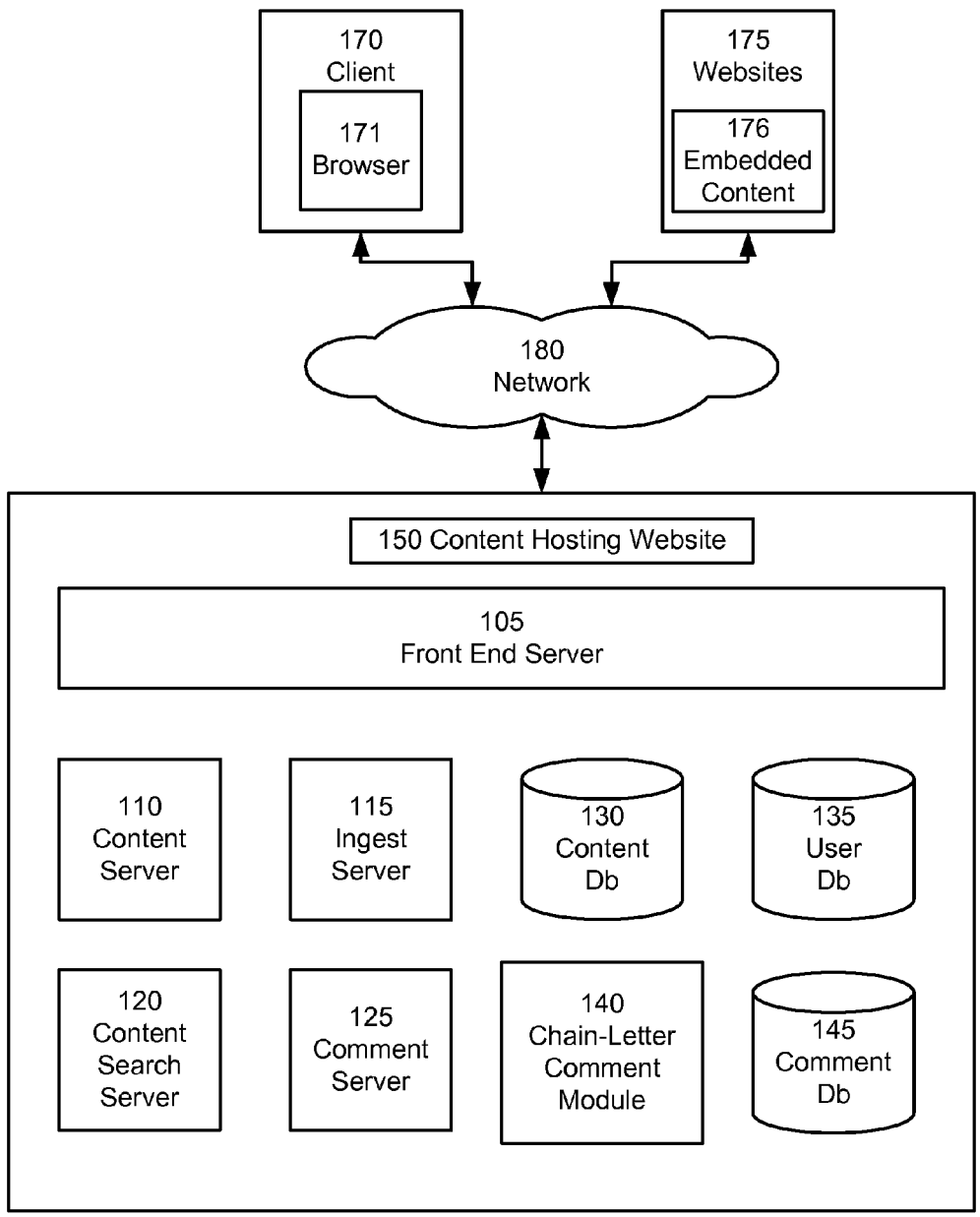
FIG. 1 illustrates one embodiment of block diagram of a system for detecting chain-letter comments on a website.

FIG. 1 shows a block diagram of a system for detecting chain-letter comments in accordance with one embodiment. A content hosting website 150 allowing user-generated comments comprises a front end server 105, a content server 110, an ingest server 115, a content search server 120, a comment server 125, a content database 130, a user database 135, a chain-letter comment module 140, and a comment database 145. The content hosting website 150 may be adapted to communicate with a client 170 using a browser 171 and third party websites 175 containing embedded content 176 via a network 180. For clarity, many conventional features, such as firewalls, load balancers, application servers, failover servers, site management tools, and so forth are not shown.

The content hosting website 150 can host and serve any type of content, including any combination of text, music, video, graphics, or the like, without limitation. The content hosting website 150 can be implemented as a blog site, a news media outlet, a forum, an ecommerce site, a video sharing site, a file sharing service, or the like, again without limitation. A suitable content hosting website 150 for implementation of the system is the YOUTUBE™ website, found at www.youtube.com; other websites which facilitate the posting of user-generated comments are known as well, and can be adapted to operate according to the teachings disclosed herein. It will be understood that the term "website" represents any method of uploading and downloading content and is not intended to be limited to content uploaded or downloaded via the Internet or the HTTP protocol. In general, functions described in one embodiment as being performed on the server side can also be performed on the client side in other embodiments if appropriate. In addition, the functionality attributed to a particular component can be performed by different or multiple components operating together.

Each of the various servers is implemented as a server program executing on a server-class computer comprising a CPU, memory, network interface, peripheral interfaces, and other well known components. The computers themselves preferably run an open-source operating system such as LINUX, have generally high performance CPUs, 1 G or more of memory, and 100 G or more of disk storage. Of course, other types of computers can be used, and it is expected that as more powerful computers are developed in the future, they can be configured in accordance with the teachings here. The functionality implemented by any of the elements can be provided from computer program products that are stored in tangible computer accessible storage mediums (e.g., RAM, hard disk, or optical/magnetic media).

In one embodiment, each client 170 executes a browser 171, and can connect to the front end server 105 via the network 180. The network 180 is typically the Internet, but may also be any network, including but not limited to any combination of a LAN, a MAN, a WAN, a mobile, a wired or wireless network, a private network, or a virtual private network. While only a single client 170 and browser 171 are shown, it is understood that very large numbers (e.g., millions) of clients are supported and can be in communication with the website 150 at any time. The browser 171 can include a content player (e.g., Flash™ from Adobe Systems, Inc.), or any other player adapted for the content file formats used in the content hosting website 150. A user can access a content from the website 150 by browsing a catalog of website contents, conducting searches on keywords, reviewing content lists from other users or the system administrator (e.g., collections of videos forming channels), or viewing contents associated with particular user groups (e.g., communities). A browser 171 can also access a content file indirectly, for example, where via an embedded video content 176 that is accessed via an embedded hyperlink in a third party website 175.

Users of clients 170 can also search for content based on keywords, tags or other metadata. In one embodiment, these requests are received as queries by the front end server 105 and provided to the content search server 120, which then searches the content database 130 for content that satisfy the queries. The content search server 120 supports searching on any fielded data for content, including its title, description, tags, author, category, and so forth. The content server 110 retrieves content selected by the content search server 120 from the content database 130, which is formatted into a file for transmission to the client 170.

Users of the clients 170 and browser 171 can upload content (which can include, for example, video, audio, images, documents, applications, etc. or any combination thereof) to the website 150 via network 180. In one embodiment, the uploaded content is processed by an ingest server 115, which processes the content for storage in the content database 130. This processing can include appropriate transformations, depending on the type of content being uploaded. For example, for video content, the processing can include format conversion (transcoding), compression, metadata tagging, and other data processing. An uploaded content file is associated with the uploading user, and so the user's account record is updated in the user database 135 as needed.

For purposes of convenience and the description of one embodiment, the uploaded content will be referred to as "content", "content files", or "content items." Content is displayed on pages, screens, or other representations. Each uploaded content item is assigned a content identifier (id) when it is processed by the ingest server 115. The content database 130 is used to store the ingested contents. The content database 130 stores content and associated metadata.

In addition to uploading content files, users can post comments related to contents already stored in the content database 130. These user-generated comments are then generated in a page for display by the content hosting website 150 when the corresponding contents are accessed by a client 170. In one embodiment, user-generated comments are managed by a comment server 125 whose tasks comprise receiving user-generated comments, storing them in the comment database 145, and accessing the corresponding stored user-generated comments for display when a content item is selected by a user. Additionally, user-generated comments are processed by a chain-letter comment module 140 whose tasks comprise detecting chain-letters within user-generated comments and facilitating responsive actions. In some embodiments, the chain-letter comment module 140 may exist as part of a general comment module configured to handle a wide range of tasks related to comments on the website 150.

The comment database 145 may also store an assortment of metadata associated with each user-generated comment. In various embodiments, the metadata associated with a user-generated comment may include information about the user responsible for the comment, geographic and temporal information related to the posting of the comment, a spam score to reflect the likelihood that the comment is spam, information about which type of spam the comment may represent, or any other information useful to the content hosting website 150. Among other potential factors, a user-generated comment may have a relatively high spam score because the content hosting website 150 has identified it as a chain-letter.

Chain-Letter Comment Distribution

A chain-letter is typically a letter which includes a request that each recipient pass on the letter by sending copies to numerous other persons. Recipients are often motivated to pass on the letter by threats that various misfortunes will befall them should they choose not to do so, or conversely by promises of obtaining good fortunes (e.g. wealth) should they comply. In this manner, the majority of chain-letters are actually not distributed by a malicious originator, but rather by otherwise well-intentioned persons who succumb to the pressure of the chain-letter threats, passing them along as instructed. Traditionally, chain-letters have been distributed primarily via postal or electronic mail. However, more and more websites have begun to display user-generated comments, providing a new medium for chain-letter propagation in the form of chain-letter comments.

A chain-letter comment typically instructs anyone who happens to view it to subsequently re-post the comment a certain number of times or, similar to traditional chain-letters, some grave misfortune will befall them (or they will miss out on some alleged good fortune). For example, a chain-letter comment may read, "If you don't cut and paste this comment into 5 videos, your mom is going to die." Similarly, a chain-letter comment may read, "Cut and paste this comment into 5 videos, and you will win a $1,000 lottery ticket." In either case, a user feels that there is "no harm" in complying with the putative threat or promise, and so the chain-letter comment quickly spreads, its posting rate growing exponentially as more and more users view and re-post copies of the original. This problem is amplified dramatically on highly popular websites such as YOUTUBE™ where chain-letter comments are viewed by a large number of users.

FIG. 2 is a screenshot from an example video hosting website, illustrating a page containing some sample chain-letter comments. The identical text "THIS IS THE STUPID- EST THING EVER!!! BUT I LOVE MY MOM AND DON'T WANT TO TAKE ANY CHANCES! If you do not copy and paste this onto 10 contents your mom will die in 4 hours" appears in two user-generated comments. Users are explicitly instructed to propagate the chain-letter comments using copy and paste methods, and the identical text, including the use of three exclamation points following the first sentence, strongly indicates that such instructions were followed. The comment by "munnkii25" further illustrates that even when users do alter the chain-letter comment, in this case by adding an apologetic note, they still tend to leave the overwhelming majority of the chain-letter comment intact.

Typically, chain-letter comments are distributed via the following process. A chain-letter comment is posted in a page on the website 150 by a single malicious user. The chain-letter comment is then read by multiple innocent users, some of whom feel compelled, for whatever reasons, to comply with the instructions laid out by the chain-letter comment and propagate it. As such, the chain-letter comment is re-submitted to the website 150 by this subset of multiple innocent users, typically using copy and paste methods. Websites 150 allowing user-generated comments may vary in the exact implementation of their comment submission process, but most provide the user a comment entry text box that facilitates copy and paste operations, such as comment field 201. Regardless of the exact method, the chain-letter comment is ultimately reposted on the website 150. At this point, the process is repeated multiple times, as the originally posted chain-letter comment and reposted chain-letter comments are read by multiple innocent users, reinitiating the process and exponentially increasing the burden on the content hosting website 150 caused by the original chain-letter comment. As can be appreciated in a content site that serves millions of content items such as videos, to millions of users, even a very small increase in the number of comments per content item results in a very large impact on the overall site load.

Chain-Letter Comment Detection

As described above, a chain-letter comment is posted more frequently by multiple innocent users, whose behavior is by and large upstanding, than by the single malicious user responsible for its creation. Thus, previously developed techniques to identify spam that focused primarily on the characteristics typical of individual malicious users—such as high ratios of outgoing messages to ingoing messages, lack of valid return addresses associated with messages, or even senders' geographic locations—are not effective. To effectively combat chain-letter comments, detection techniques preferably focus on the structure of the comments themselves or their distinctive distribution patterns.

In one embodiment, part of a chain-letter comment detection method may comprise subjecting all comments to a keyword filter as they are generated for a page to be transmitted to the client. Certain words or phrases may appear much more frequently within chain-letter comments than within other comments. These words or phrases may be included as part of a blacklist. Any comments containing at least one of the words or phrases on the blacklist may be regarded as having failed the keyword filter. Such words or phrases may comprise, "mom will die," "never be kissed," "acne will never go away," "win the lottery," or any other phrase regularly observed to be included as part of chain-letter comments. The blacklist may be updated based on observations made by one or more human or automated observers. Such updates may be implemented either continuously or periodically to stay current with emerging chain-letter comment language.

Embodiments in which a keyword filter as described above is used as the sole detection method for chain-letter comments may not be preferred. A drawback would be the likelihood of false positives. Words or phrases on the chain-letter comment blacklist, though they may appear mostly within chain-letter comments, can also appear within other innocent comments. Thus, many innocent comments would likely fail the keyword filter and be incorrectly treated as chain-letter comments, potentially causing frustration among multiple innocent users.

Figure 3:
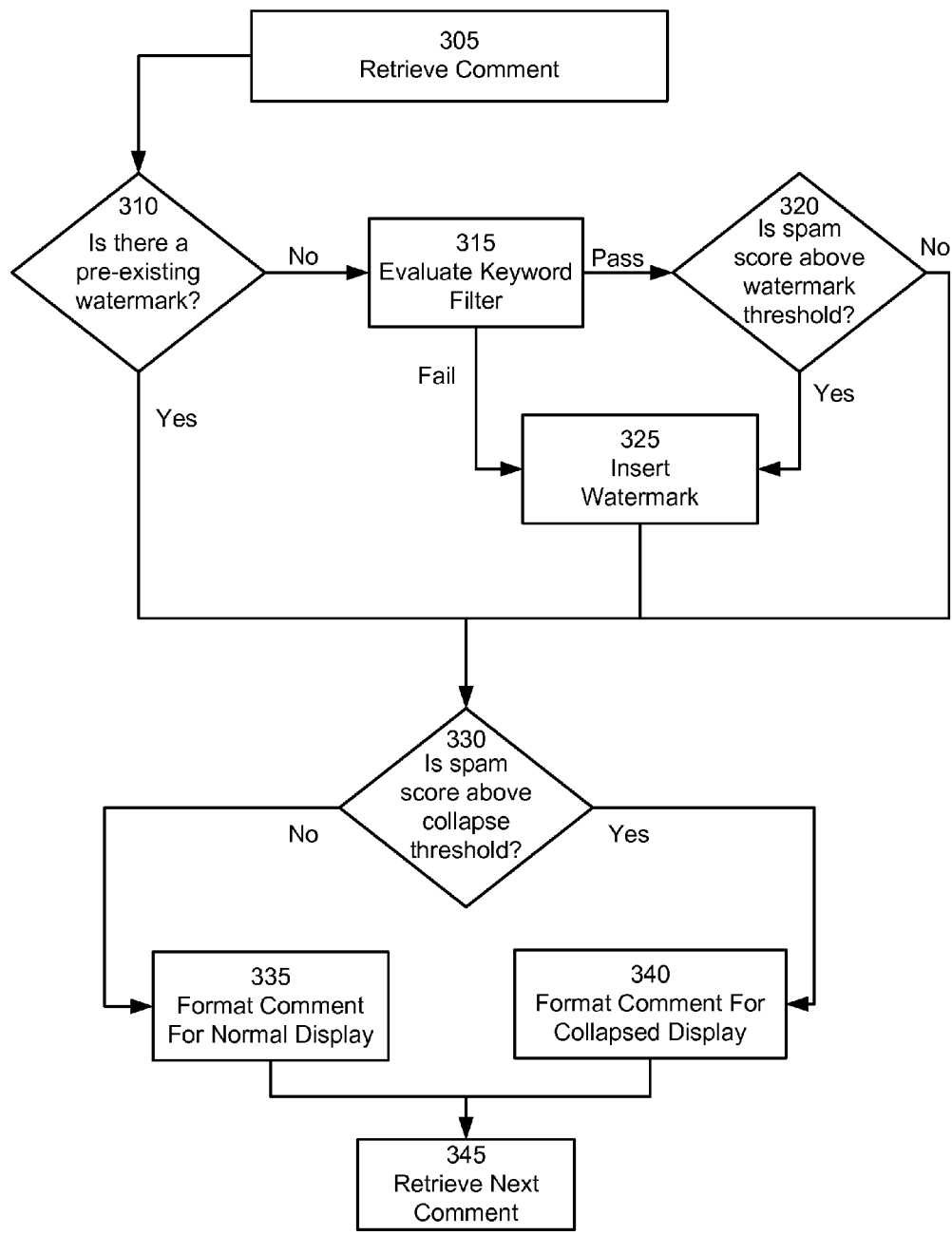
FIG. 3 illustrates one embodiment of a procedure followed by a chain-letter comment module during the generation of a comment for display.
Figure 4:
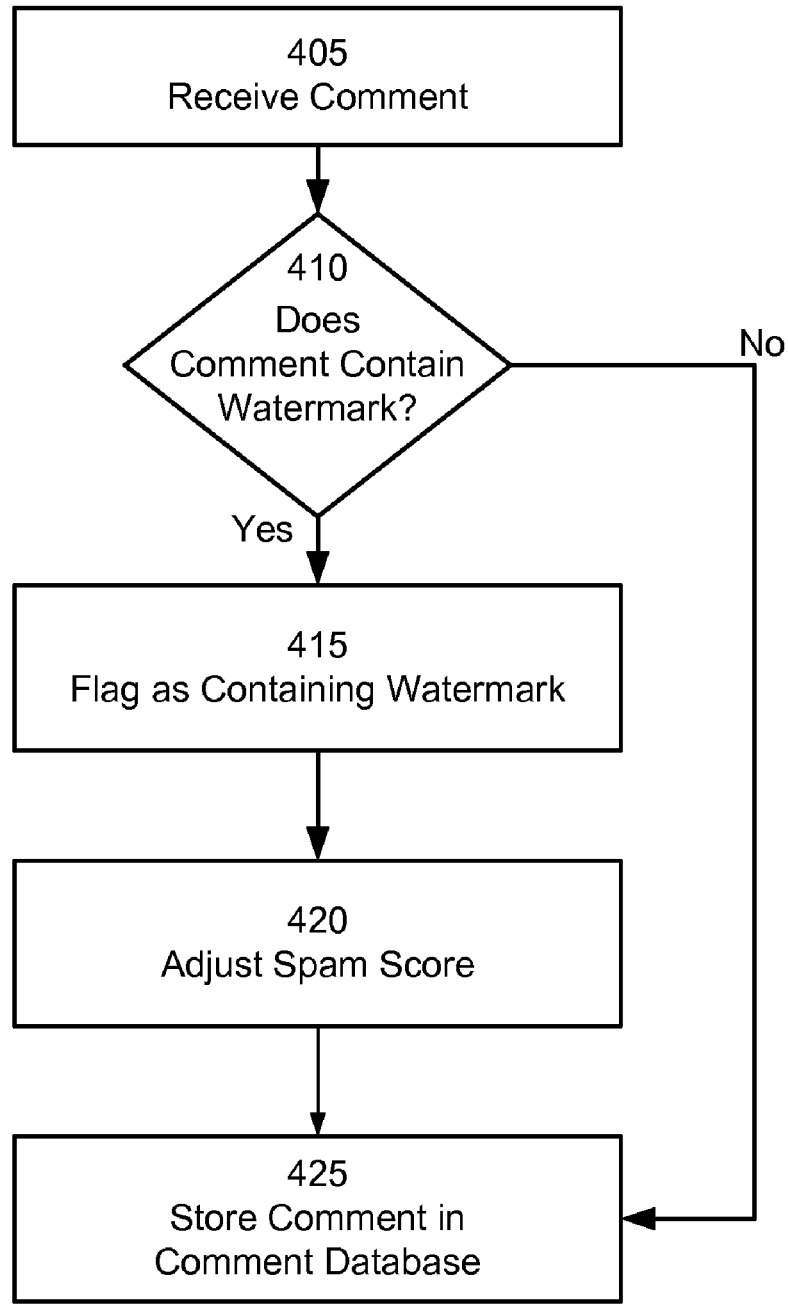
FIG. 4 illustrates one embodiment of a procedure followed by a chain-letter comment module during the initial posting of a comment by a user.

In one embodiment, a chain-letter comment detection method incorporates a keyword filter as described above, but as an initial heuristic to identify probable chain-letter comments. The chain-letter comment detection method further comprises inserting a programmatically identifiable watermark into the on-screen representation of a comment identified as probable chain-letter comment. If a comment containing the programmatically identifiable watermark is submitted to the website 150, the comment was most likely copied and pasted from the on-screen representation of a previously submitted comment already identified as a probable chain-letter comment. As copying and pasting on-screen representations of previously posted comments 420 is a common method for reposting chain-letter comments and an uncommon method for posting innocent comments, the presence of the copied watermark indicates that the comment is a chain-letter comment. Thus, the website 150 may adjust a spam score associated with the comment to reflect the high likelihood that it is a form of spam, in this case a chain-letter comment. In this way, such an embodiment uses the distinctive distribution pattern of chain-letter comments as a tool to combat them. FIGS. 3 and 4 illustrate a corresponding embodiment that comprises two processes, a first process executed during the initial posting of a comment and a second process executed during the generation of a comment for display. Together, the two processes serve to effectively combat chain-letter comments.

FIG. 3 shows a block diagram illustrating a procedure followed by a chain-letter comment module 140 during the formatting of a comment for display on a page of a content hosting website 150 according to one embodiment. The chain-letter comment module 140 retrieves 305 a comment to be formatted for display on the page from the comment database 145. The chain-letter comment module 140 scans the comment for a pre-existing programmatically identifiable watermark 310.

If the comment does not already contain the pre-existing programmatically identifiable watermark (310—No), the chain-letter comment module 140 determines whether or not it should insert 325 the watermark into the comment, thereby making it a probable chain-letter comment. To do this, the chain-letter comment module 140 first executes 315 a keyword filter, checking the comment for any words or phrases from the chain-letter comment blacklist. If the comment contains any words or phrases from the chain-letter comment blacklist (315—Fail), the programmatically identifiable watermark is inserted 325 into the comment. If the comment is not found to contain any words or phrases from the chain-letter comment blacklist (315—Pass), the chain-letter comment module then evaluates 320 the spam score associated with the comment against a pre-defined watermark threshold. Despite passing the keyword filter (315—Pass), if the associated spam score is above the pre-defined watermark threshold (320—Yes), the programmatically identifiable watermark is inserted 325 into the comment.

After determining that the comment does contain a pre-existing programmatically identifiable watermark (310—Yes), or after inserting 325 the comment with the programmatically identifiable watermark, or after determining that the spam score for the comment is below the watermark threshold (320—No), the chain-letter comment module 140 evaluates the spam score for the comment against a pre-defined collapse threshold 330. If the spam score is below the collapse threshold (330—No), the comment is treated as a non-chain-letter comment and is formatted 335 for normal display on the page of the content hosting website 150. However, if the spam score is above the collapse threshold (330—Yes), the comment is treated as a chain-letter comment and is formatted 340 for display in a collapsed or minimized format on the page. Formatting 340 a comment for display in collapsed or minimized form on the page may comprise forming only a heading or icon associated with the comment, such that a user may still view the comment by choosing to select the heading or icon associated with the collapsed comment. After either formatting 335 the comment normally or formatting 340 the comment for display in a collapsed form on the page, the chain-letter comment module 140 retrieves 345 the next comment to be formatted for display on the page.

FIG. 4 illustrates a procedure followed by a chain-letter comment module 140 during the initial posting of a comment by a user. First, the chain-letter comment module receives 405 the comment to be posted. The chain-letter comment module then determines if the comment contains a programmatically identifiable watermark 410 indicating it as a probable chain-letter comment. If a comment does contain the programmatically identifiable watermark (410—Yes), the comment is flagged 415 as containing a watermark and thereby likely being spam. In some embodiments, flagging 415 the comment may comprise altering metadata associated with the comment. Next, its spam score is adjusted 420 based on the presence of the watermark. Adjustments made to the spam score affect how the comment is handled by other processes that use the spam score, such as the process outlined in FIG. 3. Once a comment has been flagged 415 as watermarked and its spam score adjusted 420, it is stored 425 in the comment database 145. If a received 405 comment does not contain a watermark (410—No), it is immediately stored 425 in the comment database 145.

In some embodiments, it is beneficial to flag 415 a comment and adjust 420 its spam score as distinct steps because a comment's spam score may be influenced by factors other than a chain-letter comment related watermarking process. The identification of comments as potential spam by vigilant users is one example of many other processes that may potentially influence a given comment's spam score. Other examples include standard spam detection techniques such as a Bayes filter trained on a set of previously identified spam documents. Still other examples of processes that may influence a comment's spam score include analyzing the volume or similarities of comments posted by a single user. Additionally, a spam score may be influenced if the responsible user has a history of posting watermarked messages (an innocent user who propagates one chain-letter comment may be likely to also propagate other chain-letter comments). By flagging the influencing factors separately, metadata may be associated with a comment and allow insight as to the history and cause of its spam score adjustments.

Watermark Characteristics

Various embodiments use watermarks with certain characteristics to flag probable chain-letter comments on a website 150. A watermark should be imperceptible (i.e., not likely to be visually noticed) to the user when viewed within a previously posted comment on a page of the website 150; however, it is not necessary that the watermark be perfectly undetectable. Ideally, a watermark is also imperceptible when the source code for the website 150 is viewed. The watermark should survive copy and paste operations as this is the most common method for chain-letter comment reposting, remaining imperceptible throughout the process. Preferably, the watermark retains proper spacing after such paste operation. Thus, the watermark should remain imperceptible when a comment containing the watermark is copied and re-submitted to the website 150. A watermark should be purely textual as it will likely be pasted into a text box (website 150 comment submission interfaces typically comprise a text box into which new comments are entered).

Preferably, a watermark should have the above characteristics even when pasted into a non-web based text editor, such as a standard word-processing application, as an intermediate step between being copied from a posted comment and pasted into a comment entry text box. Additionally, a watermark should comprise something an innocent user is unlikely to insert or type independently to ensure that only the website 150 is likely to create the watermark. It is to be understood that the above are merely examples and that various embodiments may impose additional requirements or combinations of characteristics not explicitly stated above.

Watermark Examples

In various embodiments, many techniques for inserting a watermark into probable chain-letter comments are possible. In one embodiment, a watermark may comprise a replacement of certain characters within a probable chain-letter comment with characters of similar glyph (the shape of a typed character). For example, the capital letter 'O' may be replaced with the number zero '0', or the lowercase letter 'l' may be replaced with the number one '1'. However, such an embodiment may not always be appropriate for a given comment. For example, a chain-letter comment may not contain characters for which characters of sufficiently similar glyph exist. Also, comments may be formatted for display in one font and entered in another on a website 150. This could be problematic as two characters of similar glyph in one font may not be of similar glyph in another font.

This is particularly likely if the entry font has serifs (a seriffed font) and the display font does not (a sans-serif font), or vice versa. On many websites 150, comments are entered using a seriffed font such as Courier or Times New Roman. However, posted comments are commonly formatted for display using text in a font without serifs (sans-serif) such as Arial (depicted in text box 510), as sans-serif fonts are generally considered more legible on computer screens. Examples of seriffed and sans-serif font are given in FIG. 5. Serifs are non-structural details on the ends of some letter components included in some fonts, such as the horizontal lines at the bottom of the 'T' letters depicted using Courier font within the text box 505 of FIG. 5. Both box 505 and box 510 of FIG. 5 show examples of the lowercase letter 'l' and the number '1' in proximity. In the seriffed text 505, the characters have very similar glyph. However, in the sans-serif text 510, the characters look quite different.

In other embodiments, watermarking may comprise a deliberate misspelling of selected words within a probable chain-letter comment when it is formatted for display on a page, ideally in a way unlikely to be detected by user. In one embodiment, a watermark may comprise additional special characters inserted into the probable chain-letter comment, for example, additional exclamation points. However, such embodiments may be deemed unacceptably reliant on a lack of awareness by the multiple innocent users responsible for chain-letter comment propagation.

Figure 6:
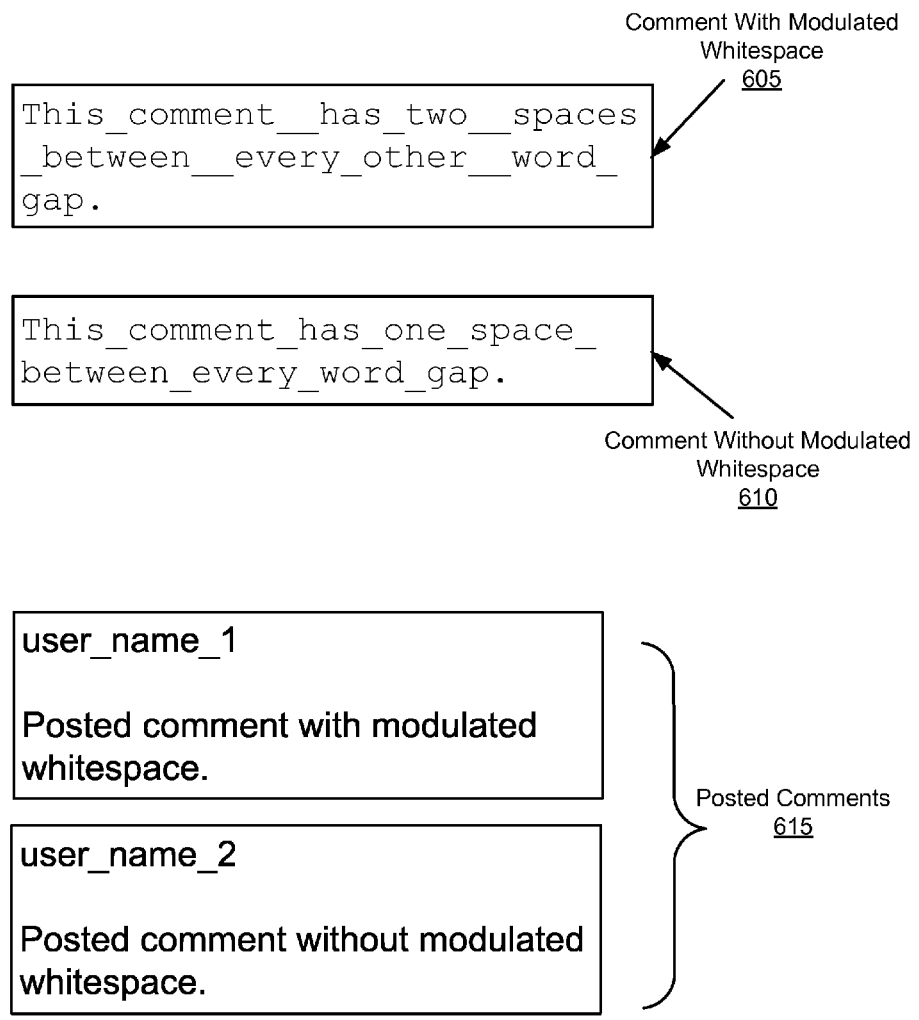
FIG. 6 illustrates one embodiment of whitespace modulation within a comment.

In another embodiment, a watermark may comprise a modification of one or more whitespaces within a probable chain-letter comment when it is formatted for display on screen. For example, additional whitespace may be inserted between one or more words of the comment. This could be done in a predetermined pattern unlikely to be independently generated by an innocent user. As illustrated in FIG. 6, every other gap between words could comprise two spaces with the other gaps comprising a single space, as in the comment with modulated whitespace 605. Most users would independently enter a comment without modulated whitespace 610. In FIG. 6, spaces are represented by underscore characters, '_', in order to clearly indicate the difference in spacing schemes. Such characters would not be displayed in practice. Any number of whitespace modulation schemes may be employed. As HTML collapses all superfluous whitespaces when text is rendered, both comments with modulated whitespace 605 and without modulated whitespace 610 would appear identical to users on-screen when viewed on a website 150 as posted comments 615, but the extra whitespaces would nonetheless be programmatically identifiable in the comment. However, differences in the whitespace may be visible when a posted comment 615 is pasted into either a comment entry text box or a non-web text editor, causing some innocent users to correct the apparently erroneous spacing of the comment. Thus, such embodiments may be deemed unacceptably reliant on a lack of awareness by the multiple normal users responsible for chain-letter comment propagation.

In one embodiment, a preferred watermark comprises one or more Unicode zero-width whitespace, such as that given by the Unicode code U+200B. A benefit of a Unicode zero-width whitespace is that it survives cut and paste operations. Another benefit of this watermark is that it is not visually detectable by a user when a watermarked comment is viewed on a page as a posted comment 615 or when a watermarked comment is placed into either a comment entry text box or a non-web text editor. It is also extremely unlikely that an innocent user would include a Unicode zero-width whitespace in an innocent comment. Thus, any comment found to contain such a watermark is highly likely to have been copied and pasted from an on-screen representation of a comment previously identified as a probable chain-letter comment.

Further, it is preferred to place the Unicode zero-width whitespace somewhere in the interior of the text of a probable chain-letter comment. This decreases the likelihood of the watermark being lost due to alterations made by an innocent user. As illustrated in the "munnkii25" comment of FIG. 2, innocent users may alter the chain-letter comment as they propagate it. However, such alterations have been found to most often occur either towards the beginning or towards the end of the chain-letter comments. Thus, inserting the watermark within the interior of the comment text increases the likelihood of the watermark being successfully transmitted.

In some embodiments, metadata associated with the comments may be altered by the chain-letter comment module 140 to trace chain-letter comments as they are propagated throughout the website 150. In such a way, the distribution patterns associated with chain-letter comments may be learned and detection techniques improved. A chain-letter comment may also propagate across multiple websites 150. To combat this problem, the disclosed embodiments may be expanded, with multiple websites 150 operating in a cooperative manner.

Additional Considerations

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for detecting chain-letters in user-generated comments on websites through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A computer implemented method for processing a spam score associated with a user-generated comment submitted to a website, the method comprising:
   receiving the user-generated comment;
   determining whether the user-generated comment includes a programmatically identifiable watermark, wherein the programmatically identifiable watermark has been previously assigned to indicate a likelihood that at least a portion of the comment comprises spam;
responsive to the comment including the programmatically identifiable watermark, augmenting a spam score associated with the comment; and
storing the comment.

2. The method of claim 1, further comprising:
responsive to the comment including the programmatically identifiable watermark, altering metadata associated with the comment.

3. The method of claim 1, wherein determining whether the user-generated comment includes the programmatically identifiable watermark comprises:
identifying the programmatically identifiable watermark based on one or more zero-width whitespace characters.

4. The method of claim 1, wherein determining whether the user-generated comment includes the programmatically identifiable watermark comprises:
identifying the programmatically identifiable watermark based on one or more Unicode whitespace characters.

5. The method of claim 1, wherein determining whether the user-generated comment includes the programmatically identifiable watermark comprises:
identifying the programmatically identifiable watermark based on whitespace characters within the comment conforming to one or more patterns.

6. The method of claim 1, wherein determining whether the user-generated comment includes the programmatically identifiable watermark comprises:
identifying the programmatically identifiable watermark based on one or more words or phrases comprising one or more particular misspellings.

7. The method of claim 1, wherein determining whether the user-generated comment includes the programmatically identifiable watermark comprises:
identifying the programmatically identifiable watermark based on the replacement of one or more characters with other characters of similar glyph.

8. A computer implemented method for formatting a user-generated comment for display on a page of a website, the method comprising:
retrieving the comment from a repository;
determining whether the comment includes a programmatically identifiable watermark, wherein the programmatically identifiable watermark has been previously assigned to indicate a likelihood that at least a portion of the comment comprises spam;
responsive to determining that the comment does not include the programmatically identifiable watermark, determining whether the comment comprises spam;
responsive to determining that the comment comprises spam and that the comment does not include the programmatically identifiable watermark, adding the programmatically identifiable watermark to the comment; and
formatting the comment for display on the page.

9. The method of claim 8, further comprising:
responsive to determining that the comment includes the programmatically identifiable watermark or that the comment comprises spam, formatting the comment for display on the page in a partial form on a client device.

10. The method of claim 9, wherein formatting the comment for display on the page in a partial form on a client device further comprises:
formatting the comment for an initial display, the initial display including an icon associated with the comment; and
transmitting the formatted comment to the client device for display thereon, such that a body of the comment is not initially displayed on the client device, and wherein the page including the comment is adapted to display the body of the comment on the client device in response to a selection of the icon associated with the comment.

11. The method of claim 8, wherein determining whether the comment comprises spam comprises:
determining that the comment includes at least one spam word.

12. The method of claim 8, wherein determining whether the comment comprises spam comprises:
evaluating a spam score associated with the comment as above a threshold.

13. A system for processing a spam score associated with a user-generated comment submitted to a website, the system comprising:
a processor;
a module, executed by the processor, configured to receive the user-generated comment;
a module configured to determine whether the user-generated comment includes a programmatically identifiable watermark, wherein the programmatically identifiable watermark has been previously assigned to indicate a likelihood that at least a portion of the comment comprises spam
a module configured to, responsive to the comment including the programmatically identifiable watermark, augment a spam score associated with the comment; and
a module configured to store the comment.

14. The system of claim 13, further comprising:
a module configured to, responsive to the comment including the programmatically identifiable watermark, alter metadata associated with the comment.

15. A system for formatting a user-generated comment for display on a page of a website, the system comprising:
a processor;
a module, executed by the processor, configured to retrieve the comment from a repository;
a module configured to determine whether the comment includes a programmatically identifiable watermark, wherein the programmatically identifiable watermark has been previously assigned to indicate a likelihood that at least a portion of the comment comprises spam;
a module configured to, responsive to determining that the comment does not include the programmatically identifiable watermark, determine whether the comment comprises spam;
a module configured to, responsive to determining that the comment comprises spam and that the comment does not include the programmatically identifiable watermark, add the programmatically identifiable watermark to the comment; and
a module configured to format the comment for display on the page.

16. The system of claim 15, further comprising:
a module configured to, responsive to determining that the comment includes the programmatically identifiable watermark or that the comment comprises spam, format the comment for display in a partial form on a client device.

17. A non-transitory machine-readable medium encoded with instructions, that when executed by one or more processors, cause the processor to carry out a process for processing a user-generated comment submitted to a website, the process comprising:
receiving the user-generated comment;
determining whether the user-generated comment includes a programmatically identifiable watermark, wherein the programmatically identifiable watermark has been previously assigned to indicate a likelihood that at least a portion of the comment comprises spam;

responsive to the comment including the programmatically identifiable watermark, augmenting a spam score associated with the comment; and storing the comment.

18. A non-transitory machine-readable medium encoded with instructions, that when executed by one or more processors, cause the processor to carry out a process for formatting a user-generated comment for display on a page of a website, the process comprising:

retrieving the comment from a repository;

determining whether the comment includes a programmatically identifiable watermark, wherein the programmatically identifiable watermark has been previously assigned to indicate a likelihood that at least a portion of the comment comprises spam;

responsive to determining that the comment does not include the programmatically identifiable watermark, determining whether the comment comprises spam;

responsive to determining that the comment comprises spam and that the comment does not include the programmatically identifiable watermark, adding the programmatically identifiable watermark to the comment; and formatting the comment for display on the page.

19. The non-transitory machine-readable medium of claim 18, the process further comprising:

responsive to determining that the comment includes the programmatically identifiable watermark or that the comment comprises spam, formatting the comment for display on the page in a partial form on a client device.

* * * * *